United States Patent [19]

Suzuki et al.

[11] 4,268,904
[45] May 19, 1981

[54] INTERRUPTION CONTROL METHOD FOR MULTIPROCESSOR SYSTEM

[75] Inventors: Seigo Suzuki, Yokohama; Seiji Eguchi, Kawasaki, both of Japan

[73] Assignee: Tokyo Shibaura Electric Co., Ltd., Japan

[21] Appl. No.: 969,008

[22] Filed: Dec. 13, 1978

Related U.S. Application Data

[63] Continuation-in-part of Ser. No. 878,085, Feb. 15, 1978, abandoned, which is a continuation of Ser. No. 741,465, Nov. 12, 1976, abandoned.

[51] Int. Cl.³ .................... G06F 9/46; G06F 15/16
[52] U.S. Cl. ............................................ 364/200
[58] Field of Search ... 364/200 MS File, 900 MS File

[56] References Cited

U.S. PATENT DOCUMENTS

| | | | |
|---|---|---|---|
| 3,317,898 | 5/1967 | Hellerman | 364/200 |
| 3,593,300 | 7/1971 | Driscoll | 364/200 |
| 3,665,404 | 5/1972 | Werner | 364/200 |
| 3,670,806 | 6/1972 | Fox et al. | 364/200 |
| 3,757,307 | 9/1973 | Cosserat et al. | 364/200 |
| 3,771,146 | 11/1973 | Cotton et al. | 364/200 |
| 3,812,463 | 5/1974 | Lahti et al. | 364/200 |
| 3,916,383 | 10/1975 | Malcolm | 364/200 |
| 4,001,783 | 1/1977 | Monahan et al. | 364/200 |
| 4,015,242 | 3/1977 | Anceau et al. | 364/200 |
| 4,080,649 | 3/1978 | Calle et al. | 364/200 |
| 4,084,228 | 4/1978 | Dufond et al. | 364/200 |
| 4,096,571 | 6/1978 | Vander Mey | 364/200 |
| 4,096,572 | 6/1978 | Namimoto | 364/200 |
| 4,151,592 | 4/1979 | Suzuki et al. | 364/200 |

Primary Examiner—Mark E. Nusbaum
Attorney, Agent, or Firm—Finnegan, Henderson, Farabow, Garrett & Dunner

[57] ABSTRACT

An interrupt control method for a multiprocessor system including a plurality of microprocessors wherein sections of a main memory, which is shared among the processors of the system, are allocated to store entry address data pointing to a plurality of interrupt-servicing programs for each of the several processors of the system. Interrupt commands are coded to designate different interrupt levels which are compared against mask flag bits and a master mask flag bit unique to each processor to determine which processor will respond to the interrupt command. The processors are arranged in a fixed priority sequence and respond to an interrupt command in a designated priority order. Controls are provided to prevent a processor which is executing an interrupt-servicing program from responding to a subsequent interrupt command until execution of the interrupt-servicing program is completed.

3 Claims, 6 Drawing Figures

INTERRUPTION CONTROL METHOD FOR MULTIPROCESSOR SYSTEM

RELATED APPLICATIONS

This application is a continuation-in-part of application Ser. No. 878,085, filed Feb. 15, 1978, now abandoned, which is a continuation of application Ser. No. 741,465, filed Nov. 12, 1976, now abandoned.

BACKGROUND OF THE INVENTION

This invention relates to an interrupt control method for a multiprocessor system of the type in which a plurality of independent microprocessors are arranged to share a common main memory.

In a multiprocessor system in which a single main memory is shared by several processors a relatively complicated monitoring program is required to supervise the allocation of interrupts to the several processors of the system. Use of such a complex monitoring program is an effective tool for rapid execution of a job. In these systems the common main memory is provided with only a single area for storing entry addresses pointing to selected interrupt-servicing programs in response to an interrupt command. The single storage area containing the entry address data is shared by all interrupt requests received by the respective processors under control of the monitoring program. This sharing of a single entry address storage area is one of the factors which complicates the monitor software.

SUMMARY OF THE INVENTION

It is accordingly an object of this invention to provide an interrupt control method for a multiprocessor system incorporating a plurality of microprocessors which simplifies the interrupt control operation to permit the use of much less complicated interrupt monitoring software.

With the interrupt control system of the invention, specified ones of the bits constituting a program status word (PSW) stored in the general register of the respective microprocessors are used to define the priority order of the microprocessors. The entry address storage area of the common main memory is divided into designated sections corresponding to the respective microprocessors and is addressable thereby in accordance with the respective priority order designations of the processors.

DETAILED DESCRIPTION OF THE EMBODIMENT

With reference to the drawings, the structure and operation of the multiprocessor system of the invention is hereinafter described.

Figure 1:
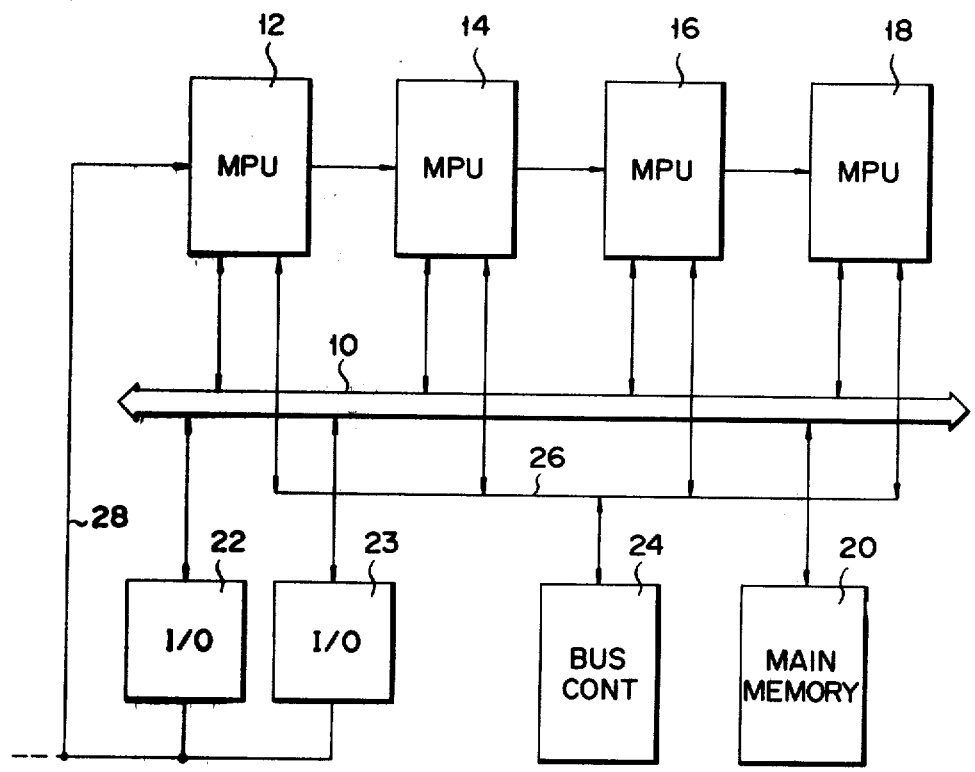
FIG. 1 is a schematic block diagram illustrating one embodiment of a multiprocessor system incorporating the interrupt control method of the invention.

Referring to FIG. 1, the system, in accordance with the present embodiment, includes four microprocessing units (MPU) 12, 14, 16 and 18. The MPU's communicate with a common main memory 20 and a plurality of input-output (I/O) devices 22 and 23 over a common data bus 10. A bus controller unit 24 transmits and receives control commands via a line 26 to and from the MPU's and connects the MPU's in accordance with a predetermined multiplexing sequence with the main memory and the I/O devices pursuant to selected control programs stored in memory 20.

I/O devices 22 and 23 transmit eight-level interrupt commands on line 28 to MPU's 12, 14, 16, and 18. Line 28 may be, for example, an eight-line cable with each interrupt level being represented by a signal on a different one of the eight lines.

Each MPU includes a general register (GR) having eight address locations 0 through 7. For each MPU, address 0 of the GR stores the contents of the program counter (PC) and address 1 stores the PSW. The remaining six address locations are used to store data in various working registers such as accumulators, address registers, and data buffering registers.

Figure 2:
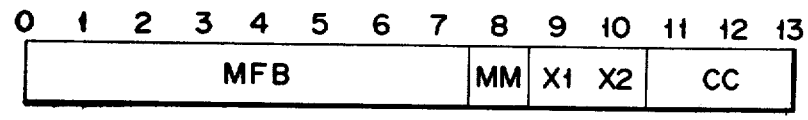
FIG. 2 is a diagram illustrating the format of the program status word utilized for each microprocessor.

The format of the PSW is illustrated in FIG. 2. As shown, the PSW is a 14-bit word wherein bits 0 through 7 represent eight mask flag bits which are employed to determine the interrupt response capability of the microprocessor. Bit 8 is a master mask flag bit which also determines the interrupt response capability of the microprocessor. When the master mask flag bit (MM) is set to the one state the MPU is in condition to receive and respond to interrupt commands. When MM is set to the zero state the MPU will not respond to an interrupt command. Bits 9 and 10 of the PSW are designated X1 and X2 bits and determine the priority status of the microprocessor.

The priority order of the four microprocessors 12, 14, 16, and 18 of the system of FIG. 1 is designated by the X1, X2 bits as follows:

| MPU | X1 | X2 | Priority Order |
|---|---|---|---|
| 12 | 0 | 0 | 1 |
| 14 | 0 | 1 | 2 |
| 16 | 1 | 0 | 3 |
| 18 | 1 | 1 | 4 |

Since MPU 12 has the highest priority status (1) it responds to an interrupt command before any other MPU, assuming that its interrupt response capability as determined by bits 0 through 8 of the PSW permits it to respond to the interrupt command.

The remaining bits 11 through 13 of the PSW are condition code (CC) bits which do not perform a function pertinent to the present invention and thus will not be described in further detail.

Figure 3:
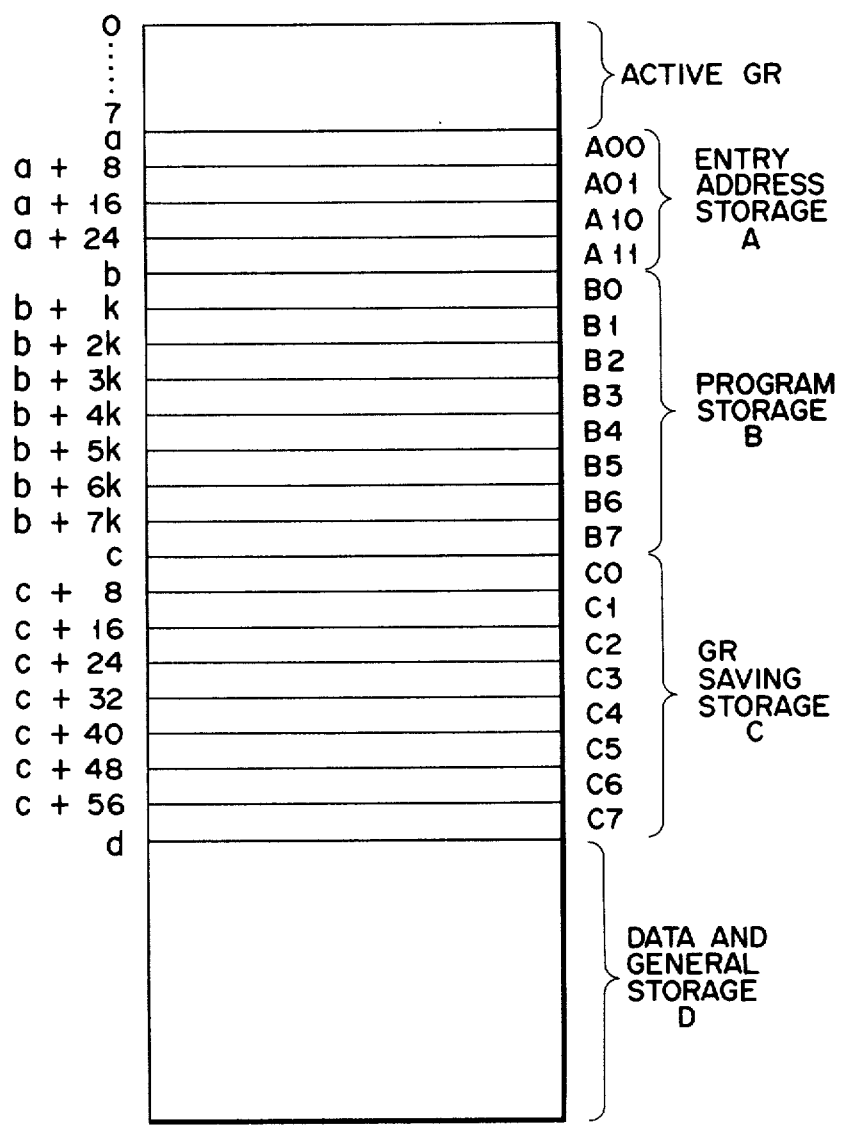
FIG. 3 is a memory map showing the allocation of the storage space in the main memory.

FIG. 3 illustrates the manner in which the storage locations of main memory 20 are allocated. The memory is divided into five main sections. The first section, comprising addresses 0 through 7, is used to store the contents of the general register of the microprocessor which is in communication with the main memory. The second section of the memory is the entry address storage section A which is divided into four subsections A00, A01, A10, and A11. These subsection designations correspond to the four microprocessors in terms of their priority order sequence. That is, subsection A00 is dedicated to MPU 12, which has a priority order designation of 00. Likewise, subsections A01, A10, and A11 are dedicated to microprocessors 14, 16, and 18, respectively.

Each subsection includes eight storage locations. Subsection A00 includes locations a through a+7 while subsections A01, A10, and A11 include locations a+8 to a+15, a+16 to a+23, and a+24 to a+31, respectively. Each location stores a program entry or pointer address designating the starting address in section B of the memory of one of the eight programs used to service the eight different interrupt levels to which MPU 12 is capable of responding. Memory subsections A01, A10, and A11 store similar data for the eight interrupt-servicing programs used by MPU's 14, 16, and 18 in responding to interrupt commands.

Memory section B is used to store the programs which are executed by the four microprocessors. Section B begins at storage location b and is divided into eight subsections B0 through B7. The starting locations in section B for the eight subsections are b for B0, b+k for B1, b+2k for B2, etc. up to location b+7k for subsection B7. As indicated, each subsection of section B includes k address locations.

Memory section C is utilized for storing general register data associated with the eight programs stored in memory section B. Section C is designated general register (GR) saving storage since when a program is not being executed by an MPU, such as during an interrupt service cycle, the general register contents associated with the suspended program are stored in the subsection of memory section C corresponding to the subsection of section B in which the suspended program resides.

Memory section C begins at storage location c and each subsection has eight storage locations. Thus, subsection C0 starts at location c, subsection C1 starts at c+8, etc. up to subsection C7, which starts at location c+56. As indicated by this format, each subsection has eight storage locations.

Memory section D begins at location d and is employed for general purpose storage.

Figure 4:
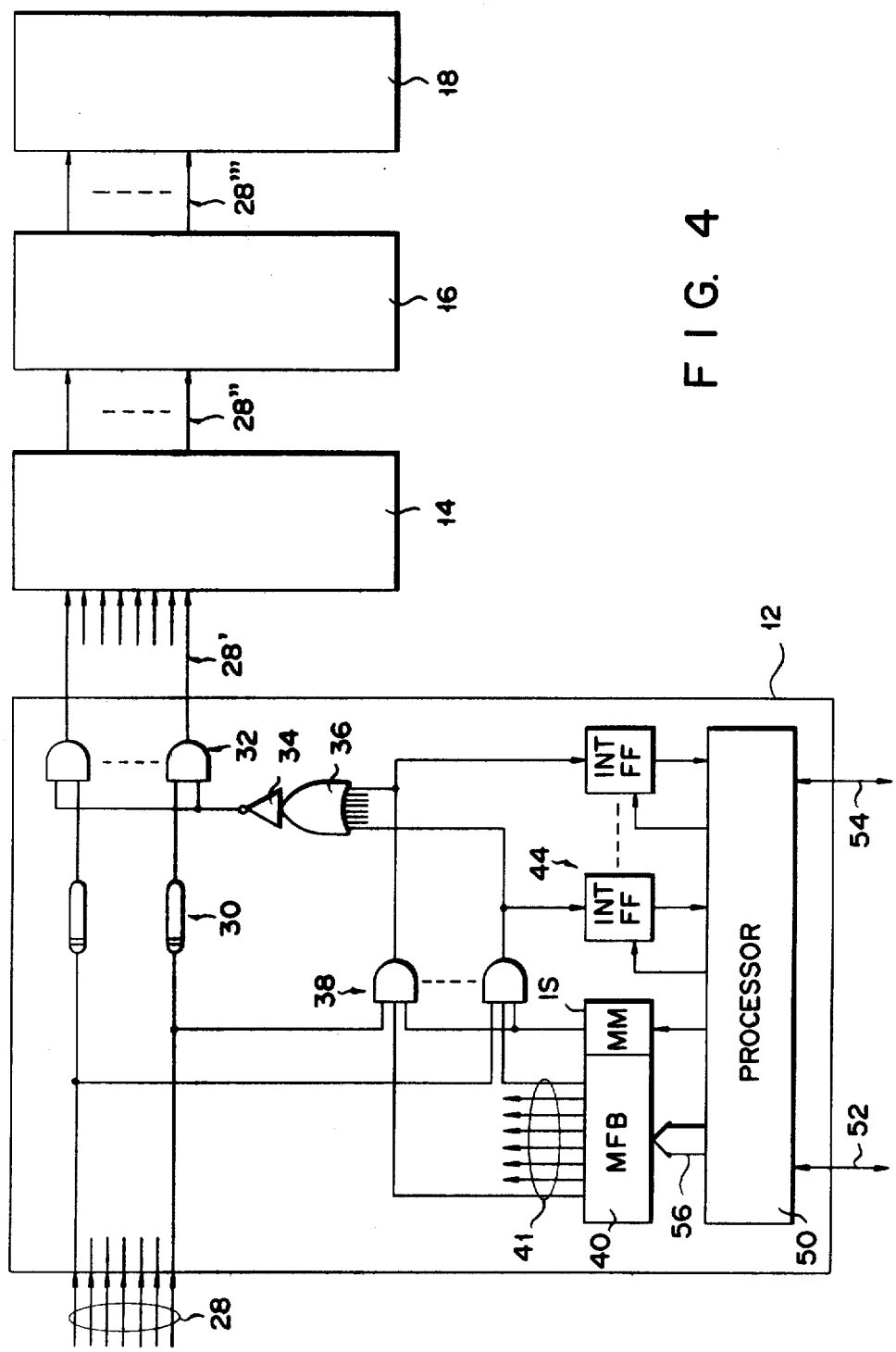
FIG. 4 is a schematic block diagram illustrating the hardware logic employed in each microprocessor for responding to interrupt commands.

FIG. 4 illustrates the interrupt response logic employed by each microprocessor for receiving and processing interrupt commands on interrupt line 28. Since the interrupt response logic for each microprocessor is the same, only that for MPU 12 is shown and described. Interrupt command line 28, as shown, includes eight lines for representing the eight different interrupt levels 0 through 7. In generating an interrupt command, an I/O device transmits a signal on one of the eight lines, whereupon the signal is presented first to MPU 12 and thereafter to MPU's 14, 16, and 18 via lines 28', 28" and 28''', respectively.

The interrupt response logic employs two sets of eight AND gates 32 and 38. One AND gate of each of the two sets is connected to one of the eight interrupt lines. Each of the AND gates 38 is also fed by one of the eight output lines 41 from a mask flag bit (MFB) register 40 which stores the mask flag bits of the MPU 12 PSW transmitted from processor 50 via cable 56. A third input to each of the eight AND gates 38 is provided from the master mask flag bit flip-flop IS. The outputs from the AND gates 38 are fed to the inputs of eight interrupt flip-flops 44.

Thus, when an interrupt command is presented via the lines 28, the AND gate 38 which receives the active interrupt command signal will be energized and will set the interrupt flip-flop 44 connected to its output if both the mask flag bit input on line 41 and the master mask flag bit input from flip-flop IS are in the 1 state. If either the mask flag bit or the master mask flag bit is 0, none of AND gates 38 will be energized and all of the interrupt flip-flops 44 will remain in the reset state.

If none of the ANDs 38 produce an output in response to the interrupt command, OR gate 36 supplies a 0 level input to inverter 34 and the latter feeds a 1 signal to the inputs of the eight AND gates 32 whereupon those ANDs feed the eight-level interrupt command signal to MPU 14 via the lines 28'. Delay circuits 30 are required at the inputs to AND gates 32 to inhibit the operation of those gates for a short period of time after initiation of the interrupt command to enable AND gates 38, OR 36, and inverter 34 to operate. If one of the AND gates 38 responds to the interrupt command by generating a 1 at its output, the delay circuits 30 will insure that the interrupt signal will not be presented to the input of AND gates 32 until after the inhibiting output from inverter 34 has been generated. This prevents the possibility of a spurious signal being passed to MPU 14 which could operate to erroneously set one of the interrupt flip-flops at that processor.

The interrupt response logic employed by MPUs 14, 16, and 18 is identical to that shown for MPU 12. Therefore, the interrupt command signal will propogate along lines 28, 28', 28", and 28''' until one of the microprocessors responds by setting one of its interrupt flip-flops. Since the interrupt command is applied first to MPU 12, which has the highest priority status, and is subsequently applied to the remaining MPUs in descending priority order, the highest priority MPU which is capable of responding to the interrupt command will accept the interrupt and initiate an interrupt-servicing cycle. If none of the MPUs responds to the interrupt command, the command remains present on input lines 28, 28', 28" and 28''' and will be accepted by the first MPU which qualifies to accept it.

OPERATION

Referring to the previously described FIGS. 1-4 and to the program flow chart diagrams of FIGS. 5 and 6, the operation of the system in accepting, processing, and terminating an interrupt cycle is hereinafter described.

Figure 5:
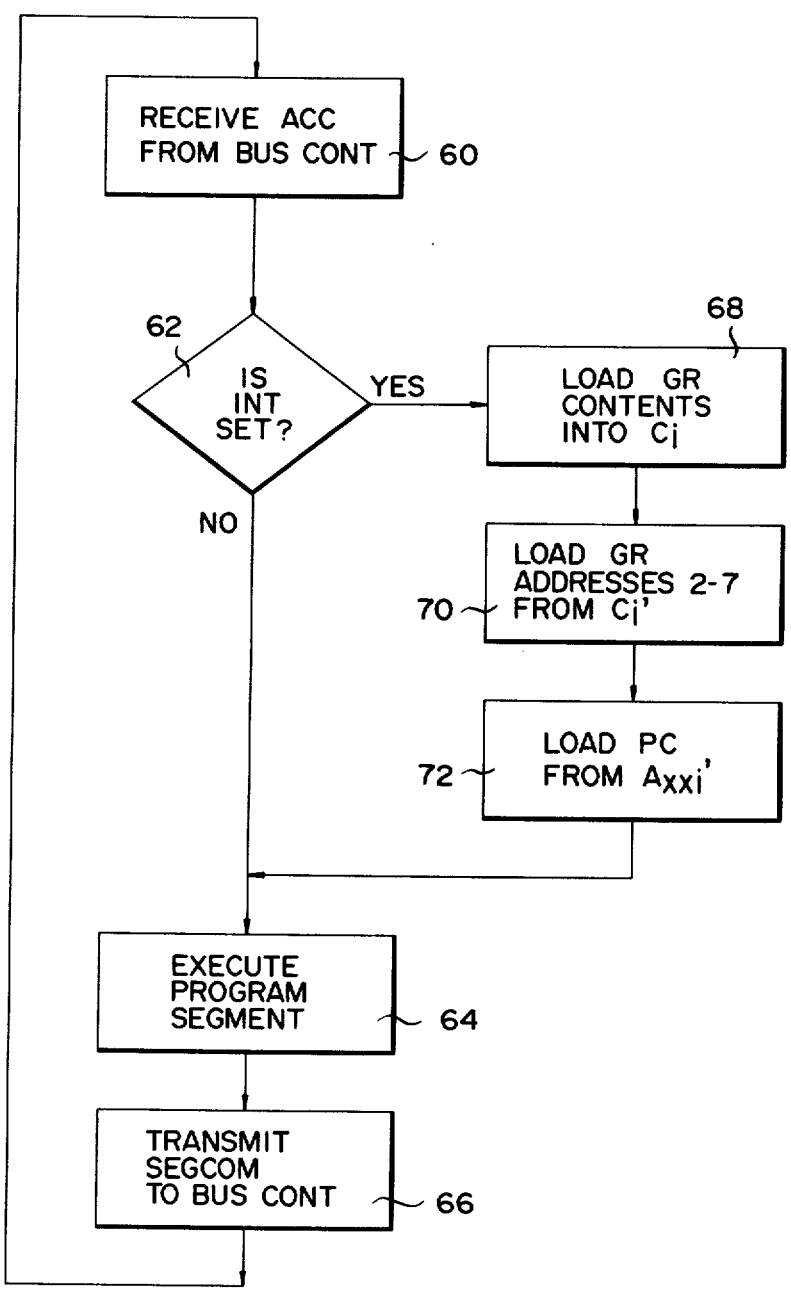
FIG. 5 is a schematic program flow chart showing the simplified interrupt control monitor used in accordance with the principles of the invention.
Figure 6:
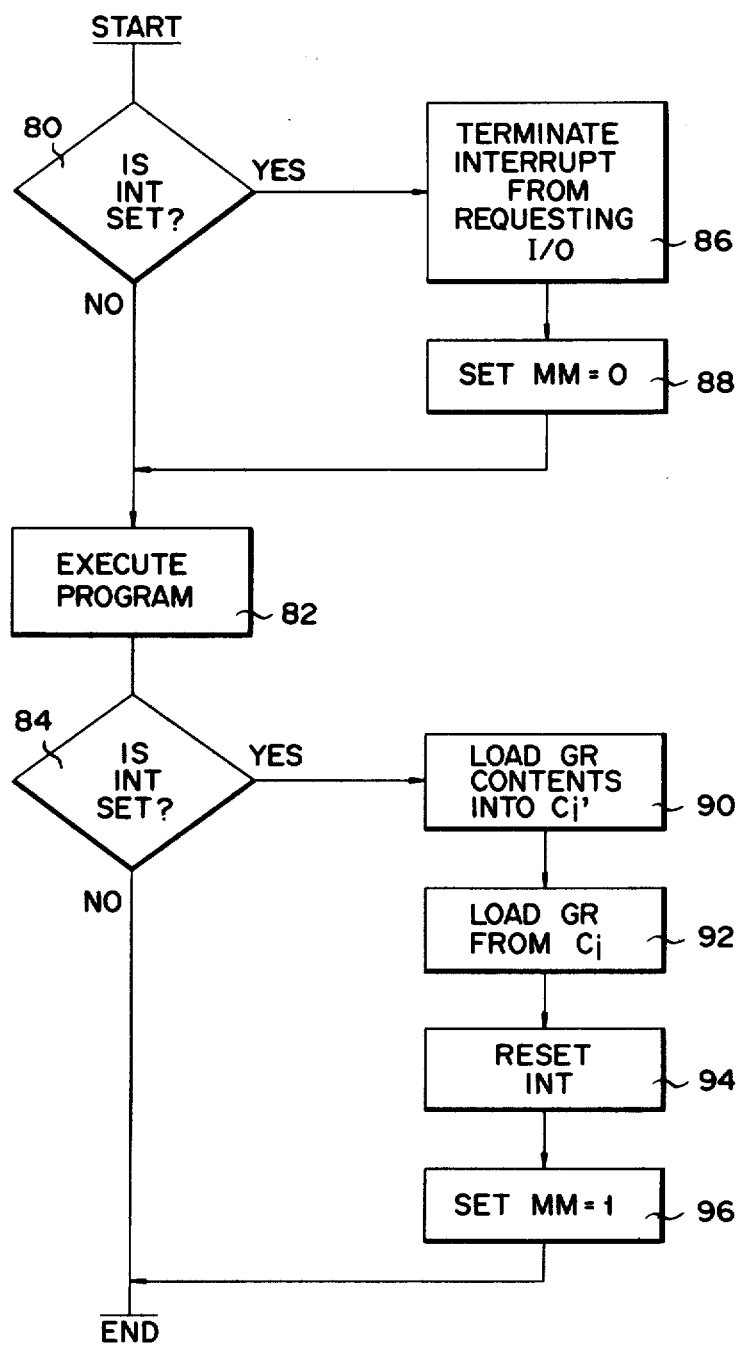
FIG. 6 is a schematic program flow chart showing a typical program used with the system of the invention, whereby simplified interrupt control is achieved.

FIG. 5 shows in a simplified program flow chart, the software routine which is employed to monitor the status of the interrupt flip-flops at the four MPUs and to initiate an interrupt cycle whenever a microprocessor accepts an interrupt command. Encoded machine language instructions appropriate for implementing the software routine illustrated in FIG. 5 may be stored in, for example, a read-only memory unit provided in each microprocessor, or in main memory 20 or bus controller 24. Since the program is quite simple, it may be stored at each individual MPU without unduly complicating the hardware. This eliminates the need for transferring program instructions to the MPU from another unit in the system over data bus 10 or control lines 26 during execution of the interrupt monitoring program.

Bus controller 24 (FIG. 1) supervises the interconnection of main memory 20 with the four MPUs of the system in accordance with standard multiplexing techniques which need not be described in detail. An appropriate bus controller is, for example, shown in the December, 1976 publication entitled "TLCS-12A Toshiba LSI Computer System" (No. AT105B). On page 192 of this publication, the bus controller collectively includes the device (I/O) control unit DCU, the memory control unit MCU, and the logic circuits shown to the right of the MCU. When the bus controller determines that an MPU should be given access to the main memory in accordance with the multiplexing sequence it transmits an access signal ACC via control lines 26 to inform the selected MPU that it may commence communication with the main memory unit. The routine diagrammatically depicted by the flow chart of FIG. 5 is executed by the selected MPU in response to receipt of an ACC signal from the bus controller.

On receipt of ACC (program step 60), the MPU queries its interrupt flip-flops (step 62) and if no interrupt flip-flop is set it proceeds to execute a segment of the program starting at the address then designated by the program counter (PC) of its general register, as indicated by program step 64. On completion of the program segment, the MPU transmits a segment complete signal SEGCOM (step 66), to the bus controller to signal termination of a particular processing task or series of processing tasks. Thereafter, control reverts to program step 60 to await receipt of the next ACC signal from the bus controller.

If during step 62 the MPU detects that one of the interrupt flip-flops is in the set state, the control program branches through a series of steps 68, 70, and 72 to initiate an interrupt cycle. In step 68, the contents of the MPU general register are loaded into main memory section C at address i. Address i designates the starting address of one of the eight subsections of memory section C. The subsection is determined in accordance with the location in memory section B of the program that is currently being executed by the MPU. In other words, if the current program, which is to be interrupted, resides in program storage subsection B5 (as determined by the PC address then present in the general register), the address Ci represents address c+40, which is the starting location of memory subsection C5.

After the contents of the general register have thus been preserved by transfer to memory section C, the program proceeds to step 70, which controls the loading of the MPU general register locations 2 through 7 with the data stored in the corresponding locations of memory subsection Ci'. Address i' is determined by the level of interrupt which initiates the interrupt cycle. This is in turn determined by the particular interrupt flip-flop which has been set in response to the interrupt command. Thus, if the seventh interrupt flip-flop is set, indicating a level 6 interrupt command, the MPU general register locations 2-7 are loaded from the corresponding locations of memory subsection C6. In this case address Ci' represents the starting address c+48 of memory subsection C6.

Thereafter, the program advances to step 72 whereupon the program counter (general register address 0) of the MPU is loaded from memory subsection Axxi'. The address designation xx represents the X1 and X2 priority order bits of the PSW. Thus, if MPU 12 is executing the interrupt cycle, the PC address 0 of the general register will be loaded from memory subsection A00, which is dedicated to MPU 12.

Further, the PC data will be taken from address location i' of memory subsection A00, address i' representing the interrupt level as described above. Thus, if MPU 12 is executing a level 6 interrupt, the PC data loaded into the general register of MPU 12 will be taken from subsection A00 at storage location a+6. This loads an entry address into the PC of MPU 12 pointing to a selected interrupt servicing program in one of the memory subsections B0–B7.

On completion of program step 72, the general register of the interrupted MPU has been set up with the data necessary to commence execution of the interrupt-servicing program and the prior general register contents of the MPU have been preserved in memory section C. The interrupt control software then advances to step 64, whereupon execution of the interrupt-servicing program is initiated and the system continues operation in the normal fashion.

Operation of the system on completion of the interrupt program, whereupon the interrupted MPU is restored to its pre-interrupt condition, is described in connection with the schematic flow chart diagram of FIG. 6, which illustrates a typical program such as is stored in the eight subsections of memory section B. Each program includes a brief sequence of instructions at the beginning and the end of the program to determine if the system is executing an interrupt cycle. As shown in FIG. 6, the first step 80 of the program queries the interrupt flip-flops to determine whether one of them is in the set condition. If no interrupt flip-flop is set, the MPU proceeds through execution step 82 and thereafter, just prior to termination of the program, again queries the interrupt flip-flops at step 84 to determine if one of them is set. If none are set, the program is terminated.

However, if the program is being initiated in response to an interrupt command, one of the interrupt flip-flops will be in the set condition during the inquiry made at step 80 and the program will branch to step 86, whereupon the interrupt requesting I/O device will be signaled that the interrupt has been accepted and will be caused to terminate the interrupt command signal to eliminate the possibility of any other MPU responding to the interrupt command. Thereafter, in step 88, the program sets the master mask flag bit MM to 0 so that the MPU executing the interrupt cycle cannot be further interrupted until after the cycle has been completed.

On completion of the interrupt-servicing program, step 84 is entered and since the program was executed in response to an interrupt command an interrupt flip-flop will still be in the set condition so that the program branches to step 90. Execution of step 90 causes the general register contents of the MPU to be loaded into memory section C at the subsection thereof designated by address location i', defined as above. Thereafter, in step 92 the system loads the general register with the entire contents of the subsection beginning at memory address Ci, which contains the previous (pre-interrupt) general register data for the MPU. This restores the general register of the MPU to the state at which it existed prior to the interrupt. The system locates the proper subsection of memory section C by searching the stored PSW words in storage locations c+1, c+9, etc. for the PSW having priority status bits X1 and X2 matching the priority status of the then-active MPU.

Thereafter, at step 94, the program causes the interrupt flip-flops of the active MPU to be reset and, in step 96, causes the master mask flag bit MM to be restored to the 1 state. Thereupon, the interrupted MPU has been fully restored to its pre-interrupt condition whereupon it is able to resume execution of the interrupted program and is once again capable of responding to an interrupt command.

Thus, as has been described, the invention provides an interrupt control method for a multiprocessor system wherein the priority order of the respective microprocessors is determined by specified ones of the bits constituting the program status word of the microprocessors and specific storage locations of the common main memory are dedicated to store linkage or entry address data for each of the microprocessors of the system. This expands the storage space of the memory which is devoted to linkage data for controlling interrupt-servicing routines and greatly simplifies and expedites the interrupt control cycle.

Further, the invention permits a plurality of interrupt requests to be efficiently received and processed and furthermore enables simplified, expeditous restoration of an interrupted processor to its pre-interruption state on completion of the interrupt cycle. Interrupt requests may include, for example, a so-called keyboard request emanating from a keyboard of an I/O device, or may include an interrupt command originating on termination of the operation of an I/O device, or an interrupt command initiated by erroneous I/O device mechanical operation, or the detection of a parity error during execution of a data transfer operation.

What is claimed is:

1. In a multiprocessor system formed of a plurality of microprocessors and including a shared memory unit, a method for controlling the processing of an interrupt command issued by an I/O device electrically interconnected with said microprocessors comprising the steps of:
    entering into the general register of each of said microprocessors a program status word including a priority order designating code indicating the relative priority in which said microprocessor is assigned to accept interrupt commands;
    storing in said shared memory unit a plurality of entry addresses at locations dedicated to said individual microprocessors and addressable in terms of said priority order designating code;
    selecting, in accordance with the priority order defined by said priority order designating code, one of said microprocessors to process an interrupt-servicing program in response to an interrupt command;
    addressing said main memory unit at the entry address data location corresponding to the priority order designating code of said selected microprocessor; and
    loading into the general register of said selected microprocessor entry address data obtained from said addressed entry address data location to enable said microprocessor to access a stored interrupt-servicing program for processing said interrupt command.

2. The method set forth in claim 1 wherein an interrupt command is encoded to represent a plurality of different interrupt levels and comprising the further steps of:
    storing in the entry address data location dedicated to each individual microprocessor a number of entry address data words corresponding to the number of different interrupt levels that can be represented by said interrupt by said interrupt command; and
    accessing during said addressing step the entry address data word corresponding to the interrupt level represented by said interrupt command to enable accessing of a stored interrupt-servicing program as designated by said encoded interrupt command.

3. The method set forth in claim 2 comprising the further step of:
    transferring, prior to said loading step, the contents of the general register of said selected microprocessor to a storage location in said main memory to preserve said general register contents for subsequent resumption of processing of the program being executed by said selected processor at the time of said interrupt command.

* * * * *